United States Patent [19]

Lhwillier

[11] Patent Number: 5,084,228
[45] Date of Patent: Jan. 28, 1992

[54] SEALING DEVICE FOR AN INSTRUMENTATION COLUMN PENETRATING THE HEAD OF A PRESSURIZED-WATER NUCLEAR REACTOR VESSEL

[75] Inventor: Christian Lhwillier, Clamart, France

[73] Assignee: Framatome, Courbevoie, France

[21] Appl. No.: 469,761

[22] Filed: Jan. 25, 1990

[30] Foreign Application Priority Data

Jan. 25, 1989 [FR] France .................... 89 00905

[51] Int. Cl.$^5$ ............................................. G21C 13/02
[52] U.S. Cl. .................................... 376/203; 376/247; 376/249
[58] Field of Search ............... 376/203, 204, 254, 260, 376/291, 292, 249, 247, 255

[56] References Cited

U.S. PATENT DOCUMENTS

| | | | |
|---|---|---|---|
| 2,997,587 | 8/1961 | Mims | 376/247 |
| 3,000,803 | 9/1961 | Morris et al. | 376/247 |
| 3,294,642 | 12/1966 | Recule et al. | 376/247 |
| 3,769,156 | 10/1973 | Brecy | 376/255 |
| 3,862,578 | 1/1975 | Schluter | 376/249 |
| 4,258,937 | 3/1981 | Barneoud et al. | 376/203 |
| 4,310,034 | 1/1982 | Guilloteau et al. | 376/203 |
| 4,753,768 | 6/1988 | Puri | 376/203 |
| 4,820,474 | 4/1989 | Leslie et al. | 376/203 |
| 4,856,354 | 8/1989 | Overbay | 376/249 |
| 4,904,442 | 2/1990 | Swidwa et al. | 376/203 |

FOREIGN PATENT DOCUMENTS 0244669 11/1987 European Pat. Off. .
2758192 6/1979 Fed. Rep. of Germany .
2170562 8/1986 United Kingdom .

*Primary Examiner*—Brooks H. Hunt
*Assistant Examiner*—Frederick H. Voss
*Attorney, Agent, or Firm*—Pollock, Vande Sande & Priddy

[57] ABSTRACT

The bearing unit of the sealing device of the thermocouple column (40) has an end part (23) in which is provided the bearing area (48) for the thermocouple column (40). This end part has two successive sections in the axial direction, a first section (25) being fastened to the outer end of the follower and a second section (26) being superposed on the first. The first section (25) has a peripheral annular throat (28) and at least three openings (29) traversing the sections (25) in an axial direction so as to open into the peripheral throat (28). The second section has openings (32) in the extension of the openings (29) of the first section. A mounting piece (30) consisting of two half-rings is introduced into the peripheral throat (28) and has tapped openings (35) in the extension of the openings (29, 32) of the first and of the second sections into which screws (36) are introduced and screws into the tapped openings (35). A sealing strip (31) is placed between the two sections (25, 26). A device (37, 45, 41) for pulling on the end of the thermocouple column (40) bears against the upper surface of the second section (26).

7 Claims, 3 Drawing Sheets

SEALING DEVICE FOR AN INSTRUMENTATION COLUMN PENETRATING THE HEAD OF A PRESSURIZED-WATER NUCLEAR REACTOR VESSEL

FIELD OF THE INVENTION

The invention relates to a sealing device for an instrumentation column and, in particular, for a thermocouple column penetrating the head of a vessel of a pressurized-water nuclear reactor.

BACKGROUND OF THE INVENTION

In pressurized-water nuclear reactors, the vessel enclosing the core of the reactor has a head with a substantially hemispherical shape having openings in which followers are fastened enabling the passage of the control rods of the reactor and of instrumentation columns such as thermocouple columns; a set of thermocouples enabling the temperature of the cooling fluid to be measured at the outlet of the assemblies of the core of the reactor is arranged in each of the thermocouple columns.

Each of the followers has a part projecting beneath the head ensuring the guidance of the thermocouple column and a part projecting above the head having means for connecting a tubular bearing and sealing unit of the thermocouple column which may be fastened in the extension of the follower.

Inside the bearing unit fastened to the follower, a shoulder is provided against which part of the thermocouple column may bear, a sealing strip being placed therebetween.

The thermocouple column which traverses the bores of the bearing unit and of the follower, situated in each other's extension, has an end which engages with a pulling device resting on the end of the bearing unit.

By virtue of the pulling device, the thermocouple column may be displaced between a low position where its sealing surface is at a distance from the shoulder of the corresponding bearing unit and a high position where the sealing surface of the thermocouple column is applied against the shoulder with a degree of contact pressure which ensures sealing.

The bearing unit of the thermocouple column generally has two parts placed in each other's extension which are assembled, a sealing strip being placed therebetween, and held in place in their assembled position by a clamping bracket engaged on corresponding tapered areas of the two parts of the bearing unit.

The lower part of the bearing unit is connected to the follower by its joining means which generally consists of a threaded part onto which is engaged a corresponding tapped bore of the lower part of the bearing unit.

The joint between the follower and the lower part of the bearing unit is completed by welding two circular seams placed to coincide in order to ensure the sealing of the screwed joint.

The upper end part of the bearing unit including the sealing area of the thermocouple column has an upper end surface against which the pulling device of the instrumentation column bears.

When it is desired to raise the vessel head, after having performed the depressurization, the tensile force exerted on the thermocouple column is relaxed and the two parts are separated from the bearing unit by disassembling the clamping brackets.

The pulling device on the thermocouple column may be separated from the latter, enabling the upper part of the bearing unit to slide in order to separate it from the thermocouple column.

The thermocouple column may then be removed completely from the follower and from the lower part of the bearing unit.

This procedure is also necessary when it is desired to change the sealing strip of a thermocouple column.

These various operations take a relatively long time to perform and may even prove impossible when the clamping pieces seize up.

SUMMARY OF THE INVENTION

The object of the invention is therefore to provide a sealing device for an instrumentation column and, in particular, for a thermocouple column penetrating the head of a pressurized-water nuclear reactor vessel, inside a tubular follower fastened in a penetration opening of the vessel head and projecting inwardly and outwardly from the head, having a tubular bearing unit fastened to the end of the follower situated outside the head and in its extension, in which a leaktight bearing area is provided for the instrumentation column traversing the bore of the tubular bearing unit and of the follower, as well as a means for pulling on one end of the instrumentation column projecting outwardly from the bearing unit and resting on the end of this bearing unit, this sealing device enabling the thermocouple column to be extracted quickly and easily, even when the clamping and bracketing parts of the bearing unit have seized up.

To this end, the bearing unit has an end part in which is provided the bearing area of the thermocouple column and on which the means for pulling the instrumentation column rests, consisting of two successive sections in the axial direction:

a first section being fastened to the outer end of the follower and having an outer, peripheral annular throat and at least three openings traversing the first section in an axial direction so as to open into the peripheral throat, a second section being superposed on the first and having openings in the extension of the openings of the first section and the bearing area of the instrumentation column, a mounting piece consisting of two half-rings being introduced into the peripheral throat of the first section and having tapped openings in the extension of the openings of the first and second sections in an assembled position where screws are introduced into the coinciding openings of the first and of the second sections and screwed into the tapped openings of the mounting piece so as to assemble the first and the second sections, a sealing strip being placed therebetween.

BRIEF DESCRIPTION OF THE DRAWINGS

In order to fully explain the invention, a sealing device according to the prior art and a sealing device according to the invention, for a thermocouple column of a pressurized-water nuclear reactor, will now be described by way of example with reference to the attached drawings.

FIG. 2A is a view on a larger scale of the detail A in FIG. 2 showing a part of the device for pulling on the thermocouple column.

DESCRIPTION OF PREFERRED EMBODIMENT

Figure 1:
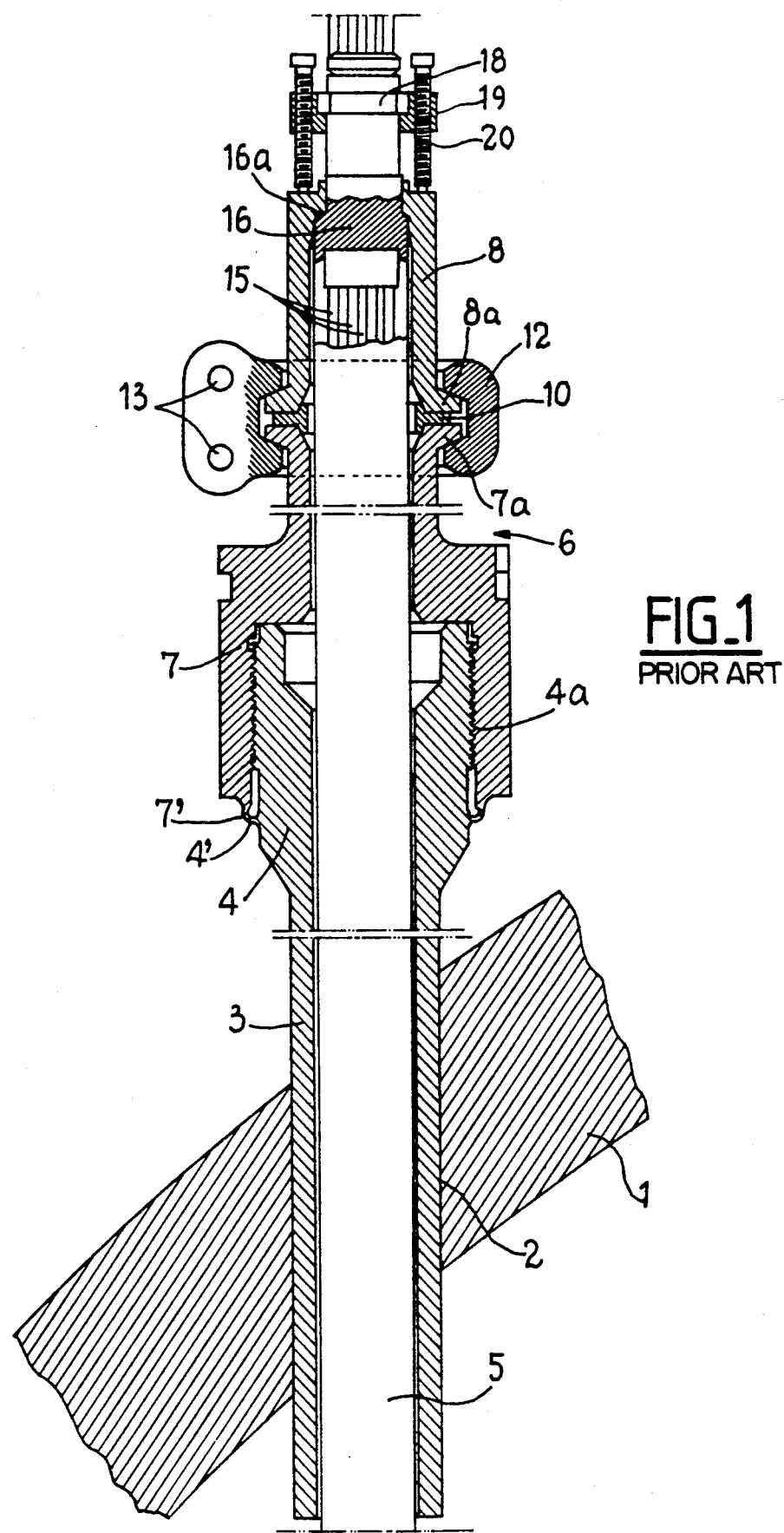
FIG. 1 is a sectional view through a vertical plane of a penetration of a thermocouple column having a sealing device according to the prior art.

As shown in FIG. 1, part of a vessel head 1 of a pressurized-water nuclear reactor is penetrated by an opening 2 in which a follower 3 is fastened leak-tightly by welding, the follower having a part projecting below the vessel head ensuring the guidance of a thermocouple column 5, and a part projecting above the vessel head 1 forming a widened part 4, on the outer surface of which is machined a screw thread 4a.

The fastening and sealing device 6 of the thermocouple column 5 is fastened onto the widened part 4 via its lower part 7 having a tapped bore which can be engaged onto the threaded part 4a of the widened part 4. Mounting is thus ensured of the bearing unit of the sealing device of the thermocouple column at the end of the follower 3. The widened part 4 of the follower and the lower part 7 of the bearing unit 6 of the sealing device have circular seams 4', 7' which coincide when the part 7 is screwed fully onto the widened part 4. The seams 4' and 7' are joined by welding so as to ensure the leaktightness of the screwed joint between the pieces 4 and 7.

The head and the followers or penetrating adaptors 3 are made in the workplace and transported to the site where the nuclear reactor is being installed.

The fastening and sealing devices of the thermocouple columns 5, on the other hand, are attached and fastened to the upper ends of the followers on the site of the reactor.

The lower part 7 of the bearing unit of the sealing device 6 is fastened onto the end of the follower so as to be capable of being disassembled if necessary, by fusing the joining zone of the seams 4' and 7'. This disassembly is, however, only carried out for repairs or in exceptional cases for servicing the penetration of the thermocouple column.

The bearing unit of the sealing device has an upper part 8 which is mounted leaktightly on the lower part 7, a metal seal 10 with a special shape being placed therebetween, the parts 7 and 8 of the bearing unit being assembled by a clamping bracket 12 with three parts which can be assembled and clamped by screws introduced into openings 13 traversing opposite ears situated at the end of the three parts in the shape of sectors having an angle of aperture of 120°.

The clamping bracket has, on its inner part, tapered areas in clamping contact with corresponding tapered areas machined on end widened parts 7a and 8a of the lower part 7 and of the upper part 8, respectively, of the bearing unit of the sealing device.

The follower 3 and the bearing unit of the sealing device have a tubular shape and arranged in each other's extension so as to provide a passage for the thermocouple column 5 formed by a tube for supporting and securing a set of thermocouples 15.

The thermocouple column 5 has a bearing and sealing piece 16 at its upper end, inside the bearing unit, this piece 16 being machined in order to form a joint area 16a with a tapered shape intended to interact with a corresponding tapered shoulder machined inside the bore of the upper part 8 of the bearing unit. A sealing strip is inserted between the two coinciding tapered areas.

Above the solid piece 16, the thermocouple column has a part projecting relative to the end of the upper part 8 of the bearing unit in which is machined a throat enabling the securing of a traction ring 18 formed from two half-rings which may be engaged laterally into the annular throat. A pressure plate 19 has axially engaged compression screws 20 and a rim which engages beneath the traction ring 18.

The end of the compression screws 20 bears against the upper surface of the part 8 of the bearing unit of the sealing device.

It will be readily understood that, upon screwing the compression screws 20, the compression plate is caused to rise and to bear beneath the traction ring 18 of the thermocouple column 5. The thermocouple column is thus caused to rise inside the bore of the bearing device 7, 8 and the sealing strip associated with the tapered area 16a of the thermocouple column to bear against the corresponding shoulder machined in the bore of the upper part 8 of the bearing unit. Leaktight fastening of the thermocouple column inside its bearing unit is thus obtained.

In order to disassemble the thermocouple column, the screws 20 are loosened, the compression plate 19 and the traction ring 18 are separated from the upper part of the thermocouple column 5, and the elements of the clamping bracket 12 are then separated.

It is then possible to slide the upper end part 8 of the bearing unit about the outer surface of the thermocouple column 5 in order to completely free this thermocouple column, which may be disassembled, or the sealing strip of which associated with the tapered area 16a may be changed.

As explained above, these operations may be lengthy and difficult and even impossible when the clamping elements are seized up.

Figure 2:
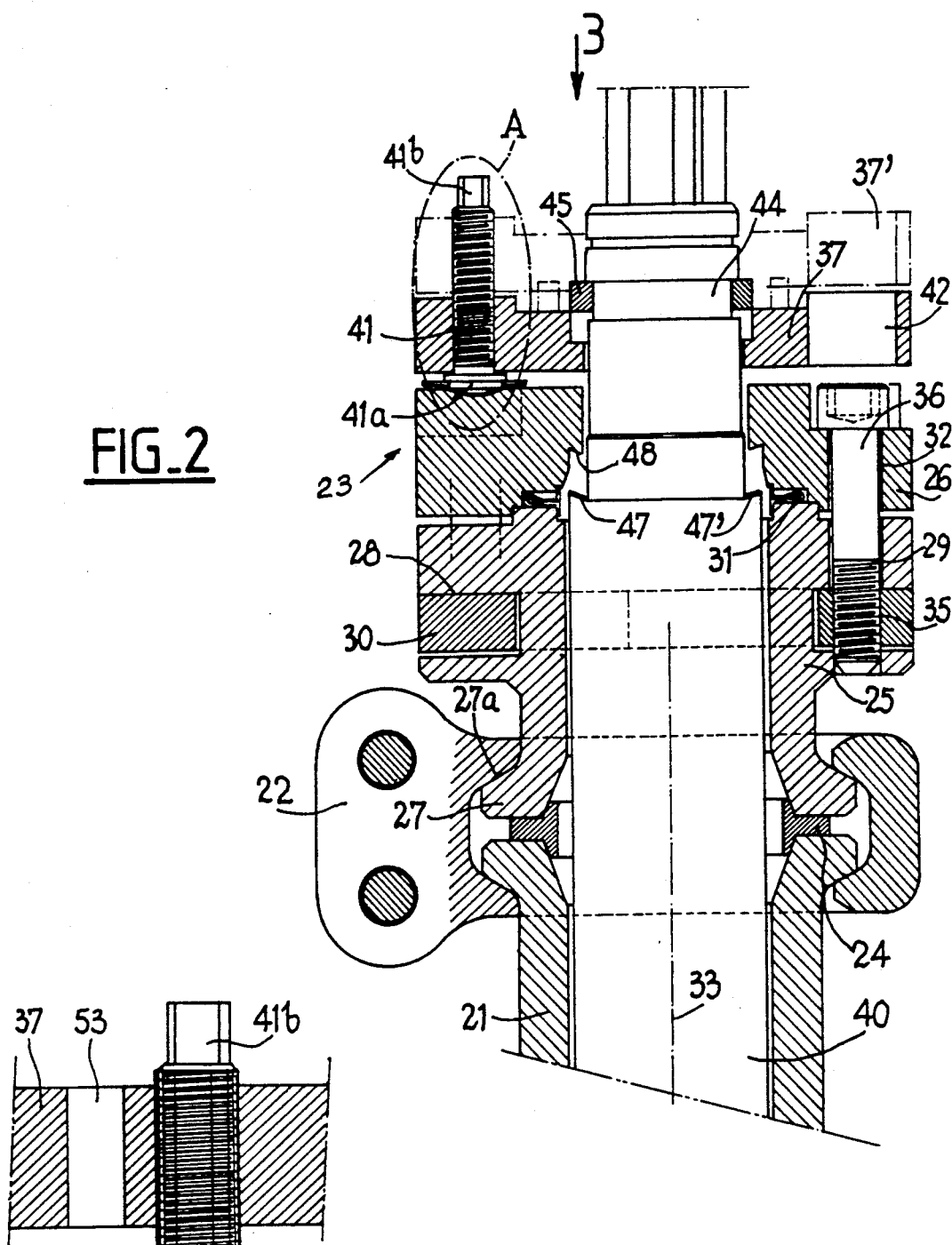
FIG. 2 shows a sectional view of a sealing device of a thermocouple column according to the invention.

FIG. 2 shows an alternative embodiment of the upper part of the bearing unit of the sealing device enabling the thermocouple column to be disassembled more easily.

The lower part 21 of the bearing unit is identical to the lower part 7 of the bearing unit of the sealing device according to the prior art shown in FIG. 1. This lower part 21 is mounted on the upper part 23 by a clamping bracket 22 identical to the bracket 12 of the embodiment shown in FIG. 1. A seal 24 is inserted between the upper end of the part 21 and the lower end of the part 23.

According to the invention, the upper part 23 of the bearing unit has two successive tubular sections 25 and 26 superposed in the axial direction.

The first section 25 has, in its lower part, a widened part 27 having a tapered bearing surface 27a against which a corresponding clamping surface of the bracket 22 is applied.

The first section 25 has, in its upper, diametrically widened part, an annular throat 28 open on its outer lateral surface and having a certain depth in the radial direction. The part of the diametrically widened piece 25 also has axial openings 29 which open in the annular throat 28 and traverse the whole of the diametrically widened part of the piece 25.

The upper part 23 of the bearing unit has a second section 26 superposed on the section 25, an annular sealing strip 31 being placed therebetween, this upper part 26 having a diameter which is substantially equal to the diameter of the part with a widened diameter of the piece 25 and being traversed by openings 32 arranged so as to come into alignment with the openings 29 of the piece 25 when these two pieces are superposed and placed in a desired relative orientation about the axis 33 of the thermocouple column and of the penetration.

In order to assemble the two sections 25, 26 of the upper part 23 of the bearing unit which have corresponding centering elements, an annular mounting piece 30 formed from two half-rings is introduced laterally into the annular opening 28 of the section 25. The annular piece 30 has four tapped holes 35 arranged so as to come into alignment with the openings 29 and 32 in the assembled position of the upper part 23 of the bearing unit. Four screws 36, are engaged into the openings 32 and 29 placed to coincide and screwed into the tapped holes 35 of the piece 30. The screws 36 ensure the mounting of the two sections 25 and 26 and the clamping of the seal 31.

Figure 3:
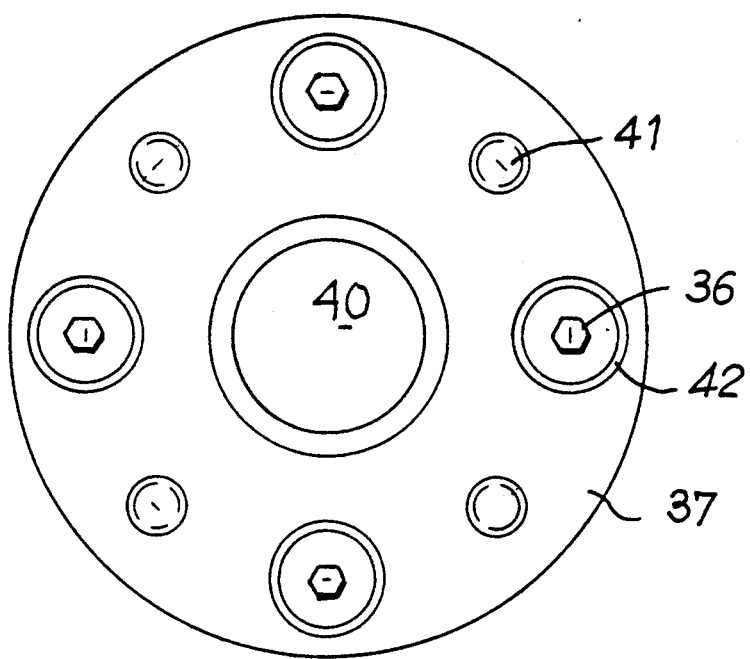
FIG. 3 is a top plan view in the direction of arrow 3 in FIG. 2.

As can be seen from FIGS. 2 and 3, a pressure plate 37 in the shape of a disc is introduced around the upper part of the thermocouple column 40, above the upper surface of the section 26. Four compression screws 41 are screwed inside tapped holes traversing the compression plate 37 in positions situated at 90° from each other. The compression plate 37 also has four openings 42 placed at 90° from each other about the axis 33 of the penetration and of the thermocouple column 40 enabling access to the heads of the screws 36 in order to tighten or loosen the screws 36.

The upper part of the thermocouple column 40 has a throat 44 serving as a housing for a traction ring 45 formed from two half-rings which can be engaged laterally into the throat 44.

The compression plate 37 has a central annular cavity which is capable of engaging with the traction ring 45 in the high position 37' of this plate shown in dot-dashed lines in FIG. 2.

The screws 41 bear with their head 41a against the upper surface of the section 26 of the bearing unit. The screws 41 also have a profiled part 41b which enables them to be screwed or unscrewed by means of a hand tool such as a wrench.

In FIG. 2, the thermocouple column 40 has been shown in its low position where its bearing and sealing area 47 with a slightly tapered shape is at a distance from the corresponding bearing shoulder 48 machined in the section 26 of the bearing unit. A sealing strip 47' with a slightly tapered shape rests against the bearing area 47.

By screwing the screws 41 which bear with their head 41a against the upper part of the section 26, the compression plate 37 is caused to rise; this exerts a tensile force on the ring 45 so as to raise the thermocouple column 40 until the seal 47' comes into contact with the bearing shoulder 48 of the section 26. The seal 47' is then clamped at the desired pressure, for example by means of a torque wrench.

The sealing strip 47' of the thermocouple column 40 is clamped at a first pressure, enabling leaktightness to be ensured in the region of the thermocouple column during the rise in pressure inside the vessel of the nuclear reactor.

When the pressure of the cooling water of the nuclear reactor reaches 70 bars, the screws 41 are tightened again, inasmuch as the pressure inside the vessel of the nuclear reactor causes a further rise of the thermocouple column 40 and a further crushing of the seal 47'.

The compression plate 37 of the traction unit of the thermocouple column 40 is then no longer in contact with the traction ring 45, and it is therefore necessary to perform a complementary screwing-in of the screws 41 in order to ensure the leaktight clamping of the thermocouple column in case the pressure tends to reduce inside the vessel of the reactor.

It is also possible to exert a tensile force on the upper part of the thermocouple column 40, before the screws 41 are tightened, in order to ensure compression of the corresponding seal 47' during the operation of the reactor at the nominal power and to perform the tightening of the screws 41 in a single operation.

FIG. 2A shows a compression screw 41 on a larger scale, with its head 41a resting against the upper surface of a cavity 49 machined on this upper surface. A washer 50 arranged about the screw head 41a has a part 50a which can be folded back and which locks the screw 41 against rotation, inside a cavity 51 machined on the upper surface of the section 26 of the upper part of the bearing unit.

The compression plate 37 is traversed by openings 53 arranged exactly vertically above the cavities 51 for locking the screws 41 so as to enable the passage of a tool performing the folding back of the part 50a of the washer 50 into the cavity 51 in order to ensure the locking of the screw 41 against rotation.

The device according to the invention enables the thermocouple column to be disassembled easily and quickly, for example prior to the opening of the head or for the purpose of changing the sealing strip 47' of the bearing area of the thermocouple column.

When the vessel of the reactor is depressurized, the screws 41 are loosened so as to lower the pressure plate from its high position 37', to its low position 37 shown in solid lines in FIG. 2. Simultaneously, the thermocouple column returns to its low position, shown in FIG. 2, where the bearing area 47 of this column is separated from the bearing shoulder 48 of the section 26 by a certain distance (for example 17 mm).

The screws 36 are then unscrewed by introducing a tool through the corresponding openings 42 of the plate 37.

When the screws 36 are freed from the threaded holes 35 of the mounting piece 30, the upper section 26 of the end part of the bearing unit may be separated from the lower section 25 simply by lifting it, after the two-part traction ring 45 has been disassembled.

There is thus no need to disassemble the bracket 22 and the lower section 25.

In the event that the screw thread of at least one of the screws 36 is seized up inside the mounting piece 30, the screw 36 may be cut at the level of a space for the passage of a tool 34, provided between the pieces 25 and 26.

The upper section 26 is then separated from the lower section 25 and the parts of the screws remaining in the piece 25 are removed by drilling. The two-part piece 30 may then be extracted from the housing 28 of the piece 25.

When reassembling, only the piece 30 and the screws 36 need to be replaced by new elements.

The invention therefore allows a thermocouple column to be disassembled quickly and easily, for example in order to have access to the sealing strip of this column.

This disassembly may be performed by simple operations, even in the event of the assembly screws being seized up.

Sections 25 and 26 of the upper part of the bearing unit 23 may have different configurations, the number of screws for carrying out the assembly of the two sections may be other than four (but no less than three) and, similarly, the number of compression screws 41 for the traction unit of the thermocouple column may be other than four but no less than three.

The lower section of the bearing unit and the piece 21 for mounting on the follower may be produced in a single tubular piece, mounting of these two pieces by a bracket no longer being necessary for disassembling the thermocouple column.

Lastly, the invention can be applied to any pressurized-water nuclear reactor having instrumentation columns penetrating the vessel head, it being possible for these instrumentation columns to be other than thermocouple columns.

I claim:

1. Sealing device for an instrumentation column penetrating a head of a pressurized-water nuclear reactor vessel, inside a tubular follower fastened in a penetration opening of said head and projecting inwardly and outwardly from said head, having a tubular bearing unit fastened to an end of said follower situated outside said head and in its extension, in which a leaktight bearing area is provided for said instrumentation column traversing a bore of said tubular bearing unit and of said follower, and means for pulling on one end of said instrumentation column projecting outwardly from said bearing unit and resting on an end of said bearing unit, wherein said bearing unit has an end part in which is provided said bearing area of said instrumentation column and on which said pulling means of said instrumentation column rests, consisting of two successive sections in an axial direction, (a) a first section being fastened to an outer end of said follower and having an outer, peripheral annular throat and at least three openings traversing said first section in an axial direction so as to open into said throat;

(b) a second section superposed on said first section and having openings in an extension of said openings of said first section and said bearing area of said instrumentation column;

(c) a mounting piece consisting of two half-rings being introduced into said throat of said first section and comprising tapped openings in the extension of said openings of said first and second sections in assembled position where screws are introduced into coinciding openings of said first and second sections and screwed into said tapped openings of the mounting piece so as to assemble said first and the second sections, a sealing strip being placed therebetween.

2. Sealing device according to claim 1, wherein said means for pulling on an end of said instrumentation column consists of an annular pressure plate arranged about the upper part of the thermocouple column projecting above the upper surface of the upper section of the bearing unit, a traction ring with two parts which can be engaged laterally into a throat machined in the upper part of said thermocouple column, and at least three compression screws engaged in tapped holes axially traversing the compression plate and bearing with their heads against a bearing surface of the second section opposite the first section.

3. Sealing device according to claim 2, wherein each of said compression screws has, about its head, a washer having a deformable locking part intended to enter a cavity of the upper surface of said second section in order to lock the screw against rotation.

4. Sealing device according to claim 1, wherein the compression plate has through openings enabling access to the heads of the screws for assembling said first and second sections.

5. Sealing device according to claim 1, wherein said pulling means has four screws arranged at 90° about an axis of said thermocouple column and about the penetration of said head of said vessel.

6. Sealing device according to claim 1, comprising four screws for assembling said first section and said second section of the upper part of said bearing unit.

7. Sealing device according to claim 1, wherein said first section is unitary, with a tubular mounting element of said bearing unit at the end of said follower situated outside said head of said vessel.

* * * * *

UNITED STATES PATENT AND TRADEMARK OFFICE
CERTIFICATE OF CORRECTION

PATENT NO. : 5,084,228
DATED : January 28, 1992
INVENTOR(S) : Christian Lhuillier It is certified that error appears in the above-indentified patent and that said Letters Patent is hereby corrected as shown below:

On the title page, Item [75] Inventors name should read --Christian Lhuillier --.

Signed and Sealed this

Eighteenth Day of January, 1994

Attest:

BRUCE LEHMAN

Attesting Officer
Commissioner of Patents and Trademarks